United States Patent
Nomura et al.

(10) Patent No.: US 9,086,719 B2
(45) Date of Patent: Jul. 21, 2015

(54) THROTTLE CONTROL APPARATUS FOR A SADDLE-TYPE VEHICLE, AND VEHICLE INCLUDING SAME

(71) Applicant: HONDA MOTOR CO., LTD., Minato-Ku, Tokyo (JP)

(72) Inventors: Yoshihiro Nomura, Saitama (JP); Kunihiko Tanaka, Saitama (JP); Kenji Tamaki, Saitama (JP); Nobuo Shigemizu, Saitama (JP); Masaru Nakayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 175 days.

(21) Appl. No.: 13/804,073

(22) Filed: Mar. 14, 2013

(65) Prior Publication Data
US 2013/0255432 A1    Oct. 3, 2013

(30) Foreign Application Priority Data
Mar. 27, 2012 (JP) ................................. 2012-071913

(51) Int. Cl.
*B62K 23/04* (2006.01)
*G05G 1/10* (2006.01)

(52) U.S. Cl.
CPC *G05G 1/10* (2013.01); *B62K 23/04* (2013.01); *Y10T 74/20474* (2015.01)

(58) Field of Classification Search
USPC ......... 74/485, 491, 504, 551.9; 123/399, 400; 73/114.36; 324/207.25; 180/335
See application file for complete search history.

(56) References Cited

U.S. PATENT DOCUMENTS

| 4,848,502 | A | * | 7/1989 | Kikuta et al. ............... 180/179 |
| 8,051,939 | B2 | | 11/2011 | Kondo et al. |
| 2009/0007716 | A1 | * | 1/2009 | Soda et al. ..................... 74/504 |
| 2009/0293668 | A1 | * | 12/2009 | Kondo et al. ............... 74/551.9 |

FOREIGN PATENT DOCUMENTS

| JP | 2009-287411 A | 12/2009 |
| WO | 2009/124907 A1 | 10/2009 |

* cited by examiner

*Primary Examiner* — Thomas Diaz
(74) *Attorney, Agent, or Firm* — Carrier Blackman & Associates, P.C.; William D. Blackman; Anne G. Sabourin

(57) ABSTRACT

A throttle control apparatus is configured to be capable of easy assembly. The throttle control apparatus also includes a rotor and an intermediate casing, which surrounds a portion of the rotor. The intermediate casing also houses a position sensor for detecting a rotational angle of the rotor. The rotor and the intermediate casing are both encased in an outer housing, which is configured and adapted to be mounted on a motorcycle handlebar. A return spring, for returning the rotor to an original position, has one end engaged with a first retaining pin on the rotor, and the other end of the return spring is engaged with a second retaining pin on the intermediate casing.

16 Claims, 4 Drawing Sheets

THROTTLE CONTROL APPARATUS FOR A SADDLE-TYPE VEHICLE, AND VEHICLE INCLUDING SAME

CROSS-REFERENCE TO RELATED APPLICATIONS

The present invention claims priority under 35 USC 119 based on Japanese patent application No. 2012-071913, filed Mar. 27, 2012. The entire subject matter of this priority document, including specification claims and drawings thereof, is incorporated by reference herein.

BACKGROUND OF THE INVENTION

1. Field of the Invention

The present invention relates to a throttle control apparatus mounted on a motorcycle handlebar, for allowing a user of the motorcycle to remotely control a throttle valve of an engine while operating the motorcycle.

2. Background Art

In a motorcycle, a throttle grip is mounted on a handlebar. When a rider rotates the throttle grip in the circumferential direction, a throttle valve mounted in an intake passage of an internal combustion engine performs an open/close operation.

It is necessary to control the open/close operation of the throttle valve in such a manner that an open/close amount of the throttle valve corresponds to a rotational amount of the throttle grip. Accordingly, a throttle control apparatus is mounted on a handlebar, and a pivotal movement of the throttle grip is detected by the throttle control apparatus.

This type of throttle control apparatus includes a rotor, which is rotated in an interlocking manner with the manipulation of the throttle grip, and a housing which houses the rotor. As shown in FIG. 4 of patent document 1, a return spring is engaged with the rotor and the housing, for returning the rotated rotor to an original position. One end of the return spring is engaged with the rotor, and the other end of the return spring is engaged with the housing.

When a rider rotates the throttle grip along the circumferential direction, the rotor is correspondingly rotated, and the return spring extends. Conversely, when the rider returns the throttle grip to its original position by turning it in the opposite direction, the extended return spring returns by an elastic action to its original shape and configuration and, as a result, the rotor also returns to the original position (angle) thereof.

[Patent Document 1] JP-A-2009-287411

The throttle control apparatus according to the prior art having the above-mentioned constitution is assembled in accordance with steps where an assembly including the rotor and a position senor which detects a rotational angle of the rotor is inserted on to a handlebar and, thereafter, a housing is mounted so as to cover the assembly. Although one end of the return spring is already engaged with the rotor, it is not easy to engage the other end of the return spring to the housing. That is, the so-called assembling property is not favorable.

Further, in this known arrangement, one end of the return spring and an engaging hole formed in the housing are aligned with each other and, further, the position of the housing is adjusted after such alignment and hence, a tension acts on the return spring. When the tension is excessively large, there may be a case where an undesired stress is applied to the return spring. Assuming a case where such a state occurs, there is a possibility that quality (particularly durability) of the return spring will differ between a return spring to which a large amount of tension is applied and a return spring to which a small amount of tension is applied.

SUMMARY OF THE INVENTION

The present invention has been made to overcome the above-mentioned drawbacks, and it is an object of the present invention to provide a throttle control apparatus which can eliminate a possibility that the quality of the return spring will differ between the return spring to which a large amount of tension is applied and the return spring to which a small amount of tension is applied while enhancing assembling property.

Throughout the present specification, reference numbers refer to the exemplary structures shown in the drawings, and such numbers are intended to illustrate, rather than to limit the invention.

To achieve the above-mentioned object, the present invention is directed to a throttle control apparatus (10) which is mounted on a handlebar (12), and includes a rotor (16) which is rotated in an interlocking manner with the manipulation of a throttle grip (14), wherein the throttle control apparatus includes:

an intermediate case (38) which surrounds a portion of the rotor (16) and houses a position senor for detecting a rotational angle of the rotor (16);

an outer housing (60) which houses the rotor (16) and the intermediate case (38) therein and is mounted on the handlebar (12); and a spring (32) for returning the rotated rotor (16) to an original position, where the spring (32) has one end thereof engaged with the rotor (16) and the other end thereof engaged with the intermediate case (38).

In assembling the throttle control apparatus (10) having such a constitution, it is sufficient that one end of the spring (32) is engaged with the rotor (16) and the other end of the spring (32) is engaged with the intermediate case (38) thus acquiring the assembly (70), the assembly (70) is inserted into the handlebar (12) and, thereafter, the outer housing (60) is mounted.

As can be understood from above, according to the present invention, it is unnecessary to engage the spring (32) with the outer housing (60). Accordingly, the throttle control apparatus (10) can be easily assembled. That is, the assembling property can be enhanced.

Further, in assembling the throttle control apparatus (10) in this manner, a tension applied to the spring (32) is extremely small. Accordingly, a stress applied to the spring (32) becomes extremely small. Accordingly, the durability of the spring (32) is enhanced.

Further, a tension applied to the spring (32) becomes a fixed value, the degree of stress applied to the spring (32) also becomes an approximately fixed value. As a result, it is possible to eliminate a possibility that quality of the spring (32) becomes irregular (different).

In the above-mentioned constitution, the rotor (16) may include the engaging member (26). In this case, one end of the spring (32) may be engaged with the engaging member (26).

It is preferable that a rib (62) for restricting the rotation of the throttle grip (14) is formed on the outer housing (60). Due to such a constitution, it is possible to prevent the throttle grip (14) from being excessively rotated. As a result, it is possible to prevent an excessively large amount of tension from being applied to the spring (32) and hence, it is possible to prevent an excessively large stress from being applied to the spring (32).

Further, it is preferable that engaging portions (20, 28) are formed on the throttle grip (14) and the rotor (16) respectively, and the engaging portions (20, 28) are engaged with each other in a state where a clearance is formed therebetween. Due to such a constitution, even when the throttle grip (14) is slightly rotated due to some reason, the rotation of the rotor (16) is obviated. Accordingly, in such a case, the opening of the throttle valve can be prevented.

As a preferred example of the position senor, a magnetic sensor (50) is named. Alternatively, a contact element (72) may be mounted on the rotor (16), and a resistor (74) with which the contact element (72) is brought into slide contact may be adopted as the position senor.

Advantage of the Invention

According to the present invention, the assembly is provided such that one end of the spring which returns the rotated rotor to an original position is engaged with the rotor and the other end of the spring is engaged with the intermediate case which houses the rotor thus constituting the assembly, and the assembly is housed in the outer housing. Accordingly, it is unnecessary to engage the spring with the outer housing and hence, the throttle control apparatus can be easily assembled.

A tension applied to the spring becomes extremely small and is set to a fixed value. Accordingly, a stress applied to the spring becomes also extremely small and is set to an approximately fixed value and hence, it is possible to enhance the durability of the spring and to eliminate a possibility that quality of the spring becomes irregular (different).

DETAILED DESCRIPTION

Figure 1:
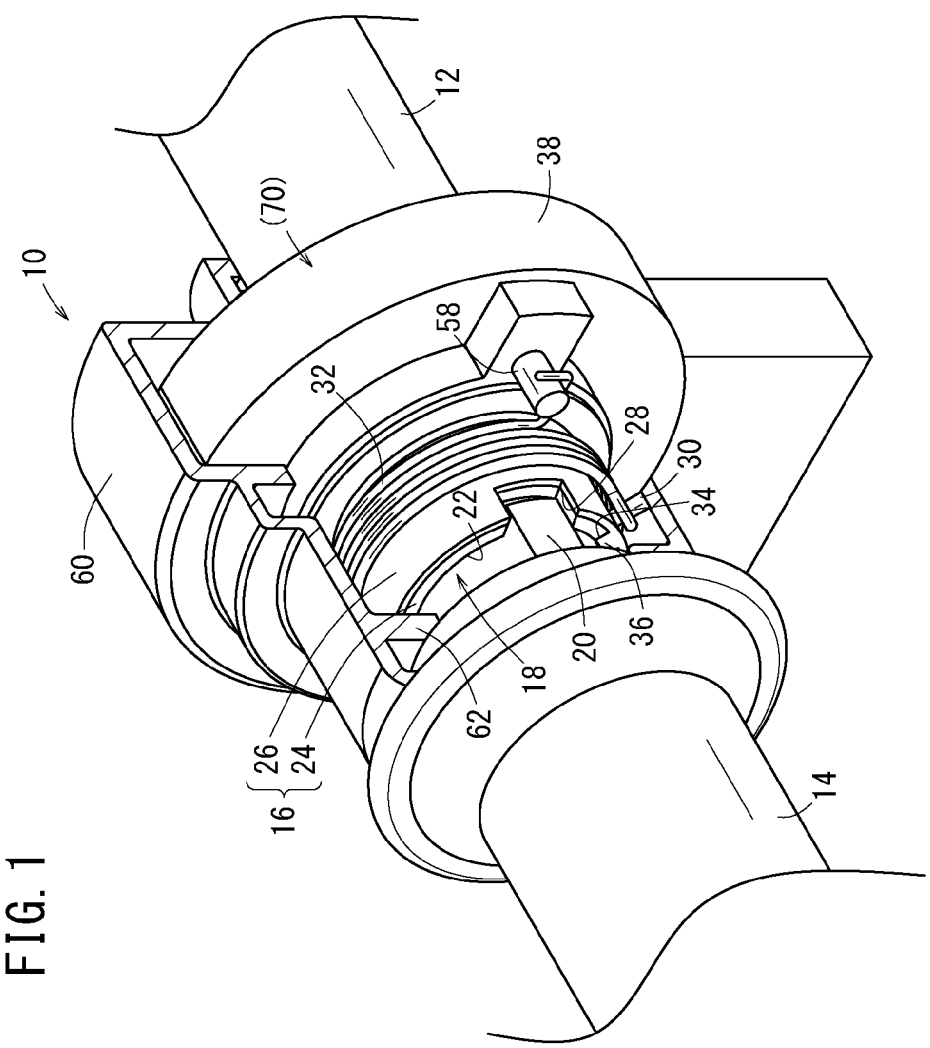
FIG. 1 is a perspective view, partially broken away, of a throttle control apparatus according to a first illustrative embodiment of the present invention.

It should be understood that only structures considered necessary for clarifying the described embodiments of the present invention are described herein. Other conventional structures, and those of ancillary and auxiliary components of the system, will be known and understood by those in the art. Hereinafter, illustrative embodiments of a throttle control apparatus according to the present invention are explained in detail, in conjunction with the attached drawings. In the following description, an end portion of the drawing on a left side may be expressed as a left end portion, and an end portion of the drawing on a right side may be expressed as a right end portion.

Figure 2:
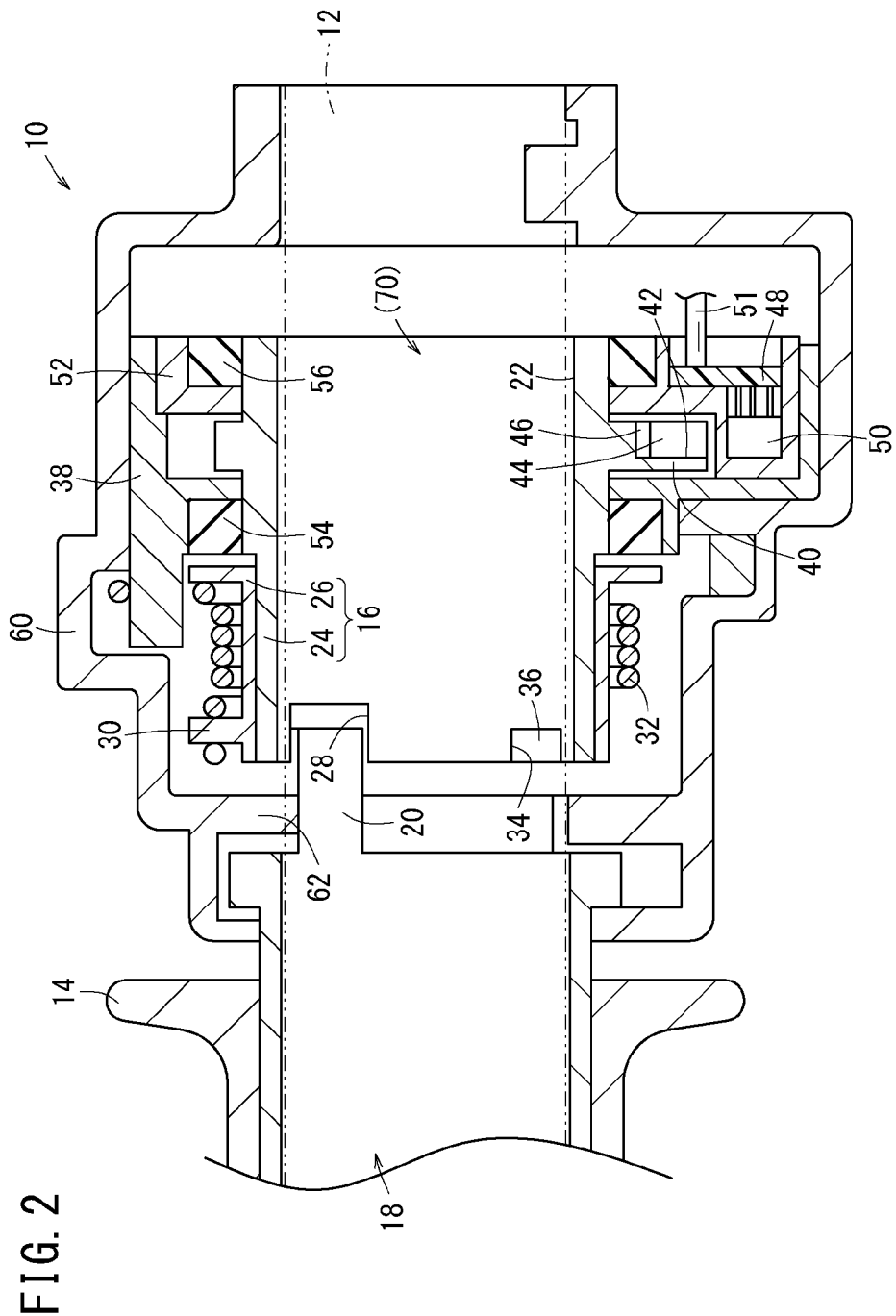
FIG. 2 is a cross-sectional view of a core portion of the throttle control apparatus of FIG. 1, taken along a vertical plane.

FIG. 1 is a perspective view, partially broken away, of a throttle control apparatus 10 according to a first illustrative embodiment of the present invention. FIG. 2 is a cross-sectional view of a core portion of the throttle control apparatus 10 of FIG. 1, taken along a vertical plane. The throttle control apparatus 10 is configured and adapted to be mounted on a handlebar 12 of a motorcycle, and converts a rotational amount of movement (rotational angle) of a rotor 16, when a throttle grip 14 is rotated by an operator, into an electric signal, which is transmitted to an electronic control apparatus (ECU or the like, not shown in the drawing).

A throttle pipe 18 is press-fitted into the throttle grip 14 for concurrent rotation therewith. The throttle pipe 18 includes an engaging projecting tab 20, which projects outwardly thereon along the axial direction of the throttle pipe 18, on an end portion thereof, on a side close to the rotor 16 (a right end portion of the throttle pipe 18). The engaging projecting tab 20 is seen best in FIG. 2.

An insertion hole 22 is formed in the rotor 16 in a penetrating manner, and the insertion hole 22 slidably receives the handlebar 12 therein. A predetermined clearance is formed between an inner wall of the insertion hole 22 and the handlebar 12 and hence, the rotor 16 is rotatably movable around the handlebar 12 along the circumferential direction thereof.

The rotor 16 includes a rotor body 24, and a substantially cylindrical sleeve member 26 which is fitted concentrically on the outside of the rotor body 24.

On left end portions of the rotor body 24 and the sleeve member 26, respectively, an engaging cutout portion 28 is formed, which extends inwardly in the axial direction of the rotor body 24. The engaging projecting tab 20 of the throttle pipe 18 enters the engaging cutout portion 28. Accordingly, when the throttle pipe 18 is rotated along with the throttle grip 14, the engaging projecting tab 20 pushes inner walls of the engaging cutout portions 28. As a result, the rotor 16 is rotatably moved together with rotary movement of the throttle grip 14.

Although two engaging projecting tabs 20 and two engaging cutout portions 28 are formed in a spaced apart manner from each other by 180° in an actual constitution, in FIG. 1 and FIG. 2, only one engaging projecting tab 20 and only one engaging cutout portion 28 are shown. The corresponding component parts on the other side are identical to those shown.

As understood from FIG. 2, the engaging projecting tab 20 and the engaging cutout portion 28 are spaced apart from each other with a predetermined distance therebetween, and accordingly, a gap or clearance is formed between the engaging projecting tab 20 and the engaging cutout portion 28.

Further, a first retaining pin 30 is formed on an outer peripheral wall in the vicinity of the left end portion of the sleeve member 26, such that the first retaining pin 30 projects outwardly in the radial direction. The first retaining pin 30 may be characterized as an engaging member. One end of a return spring 32, which constitutes a spring, is engaged with the engaging member provided by the first retaining pin 30 (particularly, see FIG. 1).

A plurality of cutout portions 34, which extend along the axial direction of the rotor body 24, are formed on a left end portion of the rotor body 24. In addition, a plurality of projecting tabs 36, which project inwardly in the diametrical direction, are formed on an inner peripheral wall of the sleeve member 26. The rotor body 24 and the sleeve member 26 are connected to each other by fitting the projecting tabs 36 in the cutout portions 34.

A right end portion of the rotor body 24 is housed in an intermediate case 38. In other words, the left end portion of the rotor body 24 extends outwardly beyond, and is exposed from the intermediate case 38. The sleeve member 26 is fitted on to the exposed left end portion of the rotor body 24. A right end portion of the sleeve member 26 is also inserted into the intermediate case 38.

As shown in FIG. 2, a flange 40 is formed on the right end portion of the rotor body 24, and is housed in the intermediate case 38. The flange 40 projects outwardly in a radial direction of the rotor body. A cutout portion 42 is formed on a peripheral part of the flange 40 in a dented manner. A magnet 44 and a back yoke 46 are fitted into the cutout portion 42 of the flange 40.

A Hall element 50 is arranged outside the flange 40 in the radial direction. The Hall element 50 is electrically connected to a circuit board 48. A magnetic flux density of a magnetic field, generated by the magnet 44 and the back yoke 46, is detected by the Hall element 50. In other words, the Hall element 50 detects a magnetic force and functions as a magnetic sensor.

The Hall element 50 outputs an electric signal corresponding to magnitude of the magnetic flux density. The electric signal is transmitted to an ECU or the like via a harness 51.

An inner support member is interposed between a right end portion of the rotor body 24 and the intermediate case 38. The inner support member supports the circuit board 48, and a portion of the inner support member protectively covers the Hall element 50.

In FIG. 2, reference symbols 54, 56 indicate a first sealing member and a second sealing member respectively.

As shown in FIG. 1, a second retaining pin 58, which extends along the axial direction of the throttle grip 14, is formed on an end surface of the intermediate case 38 which faces the throttle grip 14 in an opposed manner. The other end of the return spring 32 is engaged with the second retaining pin 58.

The sleeve member 26 is inserted into a spiral-shaped coil portion of the return spring 32. Accordingly, when the rotor 16 is rotated, one end of the return spring 32 which is engaged with the first retaining pin 30 is pulled. As a result, the return spring 32 is stretched.

In the above-mentioned constitution, the rotor 16, the intermediate case 38, the circuit board 48 and the Hall element 50 are all contained in an outer housing 60, so that these parts are protected by the outer housing 60.

Ribs 62 are formed extending radially inwardly on an inner wall of the outer housing 60. Although two ribs 62 are formed inside of the housing, only one rib 62 is shown in FIG. 1 and FIG. 2.

The positions of the respective ribs 62 correspond to positions of the engaging projecting tabs 20 formed on the throttle pipe 18. That is, when the throttle pipe 18 is rotated by a predetermined amount, the engaging projecting tab 20 is brought into contact with a side surface of either one of two ribs 62. Due to such a contact, further rotation of the throttle pipe 18 is restricted, so that the ribs 62 function as stop members to limit pivotal movement of the throttle pipe.

A left bottom wall of the outer housing 60 contacts an outer peripheral wall of the throttle grip 14, and the ribs 62 and a right bottom wall of the outer housing 60 contact an outer peripheral wall of the handlebar 12.

The throttle control apparatus 10 according to this embodiment is substantially constituted as described above. Next, the manner of operation and advantageous effects of the throttle control apparatus 10 are explained.

In assembling the throttle control apparatus 10 during a motorcycle manufacturing process, the intermediate case 38 is mounted on a portion (the right end portion in FIG. 1 and FIG. 2) of the rotor body 24 on which the magnet 44, the back yoke 46 and the like are preliminarily mounted. At this point of time, a remaining portion (the left end portion shown in FIG. 1 and FIG. 2) of the rotor body 24 is exposed.

On the other hand, the sleeve member 26 is received inside of the spiral-shaped coil portion of the return spring 32. At this point of time, one end of the return spring 32 may be engaged with the first retaining pin 30 or may not be engaged with the first retaining pin 30.

Next, the left end portion of the rotor body 24, which is exposed from the intermediate case 38, is inserted into the sleeve member 26. Here, it is not particularly necessary to align the position of the cutout portion 34 formed on the rotor body 24 and the position of the projecting tab 36 formed on the sleeve member 26 with each other. Due to such a constitution, the projecting tab 36 formed on the sleeve member 26 is brought into contact with the left end surface of the rotor body 24 and hence, the sleeve member 26 is dammed up or stopped. As a result, an insertion amount of the sleeve member 26 is made small.

In such a state, the other end of the return spring 32 is engaged with the second retaining pin 58 formed on the intermediate case 38. When one end of the return spring 32 is not engaged with the first retaining pin 30 yet, one end of the return spring 32 is also engaged with the first retaining pin 30.

Next, the position of the cutout portion 34 formed on the rotor body 24 and the position of the projecting tab 36 of the sleeve member 26 are aligned with each other by holding and rotating the sleeve member 26. Here, although a tension is applied to the return spring 32 so that the return spring 32 is slightly extended, a rotational amount of the sleeve member 26 is small and hence, a stress applied to the return spring 32 is also small.

Figure 3:
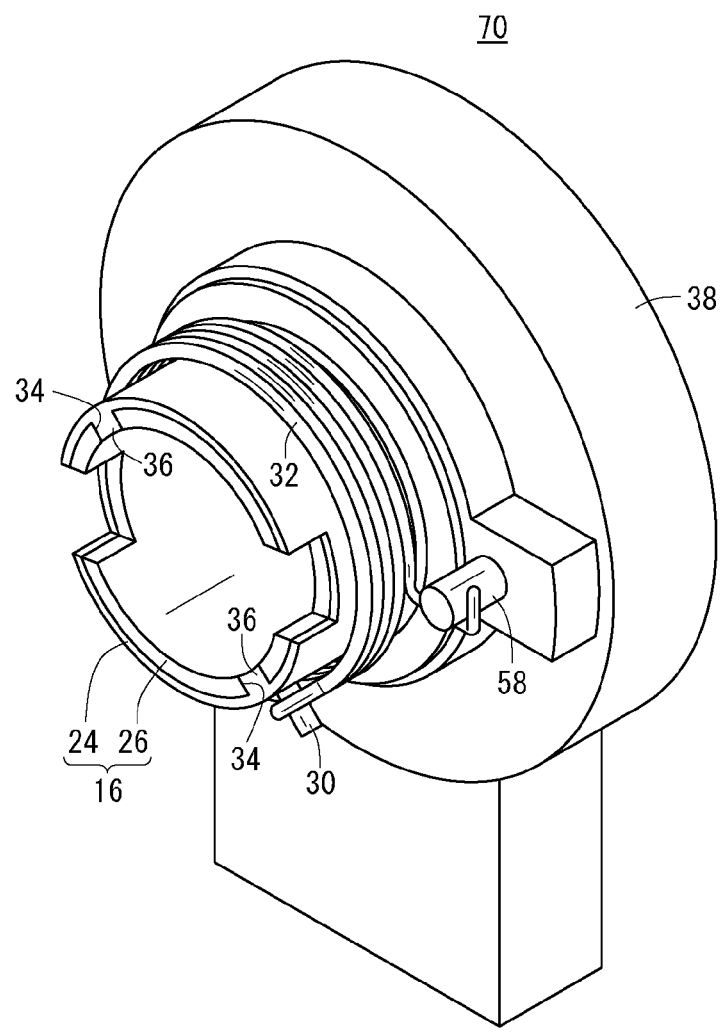
FIG. 3 is a perspective view of a rotor and an intermediate case which are components of the throttle control apparatus of FIGS. 1-2.

Then, the projecting tab 36 is inserted into the cutout portion 34 by pushing. Due to such an operation, the rotor body 24 and the sleeve member 26 are connected to each other so that, as shown in FIG. 3, an assembly 70 constituted of the rotor 16 and the intermediate case 38 can be obtained.

Next, the assembly 70 is inserted into the handlebar 12. Then, the throttle pipe 18 on which the throttle grip 14 is fitted is mounted on the handlebar 12 and, thereafter, the outer housing 60 is mounted on the handlebar 12 thus constituting the throttle control apparatus 10. Here, the engaging projecting tab 20 of the throttle pipe 18 is inserted into the engaging cutout portion 28 of the rotor 16.

As described above, according to this embodiment, the return spring 32 can be easily engaged. That is, the assembling property of the throttle control apparatus 10 can be enhanced.

Further, a stress which is applied to the return spring 32 at the time of assembling the throttle control apparatus 10 is small as described above so that the durability of the return spring 32 is enhanced. In addition, in performing the above-mentioned assembling, a rotational amount of the sleeve member 26 is set to a fixed value and hence, a stress applied to the spring becomes also an approximately fixed value. Accordingly, it is possible to eliminate a possibility that quality of the spring becomes different.

Further, a left bottom wall of the outer housing 60 is brought into contact with an outer peripheral wall of the throttle grip 14, and the ribs 62 and the right bottom wall of the outer housing 60 are brought into contact with an outer peripheral wall of the handlebar 12 and hence, the positional displacement of the outer housing 60 hardly occurs. That is, a so-called play hardly occurs. Still further, a fixing width of the outer housing 60 can be made small and hence, the degree of freedom in laying out the throttle control apparatus 10 can be enhanced.

Next, the manner of operation of the throttle control apparatus 10 is explained. The throttle control apparatus 10 is mounted on the handlebar 12 of the motorcycle. In such a state, a magnetic field is generated by the magnet 44 and the back yoke 46. A magnetic flux density in such a state is detected by the Hall element 50. The Hall element 50 outputs an electric signal with an output corresponding to magnitude of the magnetic flux density.

When motorcycle operator rotates the throttle grip 14 mounted on the distal end of the handlebar 12, the throttle pipe 18 is also concurrently rotated with the pivotal movement of the throttle grip 14. As a result, the engaging projecting tab 20 formed on the throttle pipe 18 pushes the inner wall of the engaging cutout portion 28 formed on the rotor 16 and hence, the rotor 16 is rotated. Here, the return spring 32 is selectively pulled and extended.

A predetermined clearance or gap is formed between the engaging projecting tab 20 and the engaging cutout portion 28. Accordingly, for example, when a rider slightly rotates the throttle grip 14 mistakenly, it is possible to prevent the occurrence of the above-mentioned rotation of the rotor 16 and extending of the return spring 32. That is, it is possible to prevent the throttle valve from being opened by erroneous driving.

Along with such rotation, positions of the magnet 44 and the back yoke 46 mounted on the rotor 16 are changed. Accordingly, a magnetic flux density in the vicinity of the Hall element 50 is changed. The Hall element 50 transmits an electric signal to the ECU and the like with an output amount corresponding to a change amount of the magnetic flux density.

By detecting a change amount of the magnetic flux density as described above, a rotational angle of the rotor 16, that is, a rotational amount of the throttle grip 14 (throttle opening) can be easily evaluated.

When the rider releases his hand from the throttle grip 14, the extended return spring 32 returns to an original state due to the elasticity of the return spring 32 and hence, the rotor 16, the throttle pipe 18 and the throttle grip 14 return to their original positions respectively.

In the above-mentioned steps, when the throttle pipe 18 is rotated by a predetermined amount, the engaging projecting tab 20 is brought into contact with the side surface of either one of the two ribs 62 as described above. Due to such a contact, further rotation of the throttle pipe 18 and, correspondingly, further rotation of the throttle grip 14 can be restricted. That is, the ribs 62 play a role of restricting a movable range of the throttle pipe 18 and the throttle grip 14.

Due to such a constitution, it is possible to prevent the throttle grip 14 from being excessively largely rotated. Accordingly, it is possible to prevent an excessively large amount of tension from being applied to the return spring 32 whereby it is possible to prevent an excessively large stress from being applied to the return spring 32. As a result, the durability of the return spring 32 is enhanced.

Further, even when an impact is applied to the throttle pipe 18 due to falling of the motorcycle or the like by a chance so that the throttle pipe 18 is displaced toward a rotor 16 side, the ribs 62 are brought into contact with the distal end surface (right end surface) of the throttle pipe 18 so that the throttle pipe 18 is stopped. Accordingly, the ribs 62 receive a load from the throttle pipe 18.

As described above, the displacement of the throttle pipe 18 can be prevented and an impact to the throttle pipe 18 can be alleviated and hence, it is possible to prevent the rotor 16, the magnet 44, the back yoke 46, the Hall element 50 and the like from being damaged.

The present invention is not particularly limited to the above-mentioned embodiment, and various modifications are conceivable without departing from the gist of the present invention.

Figure 4:
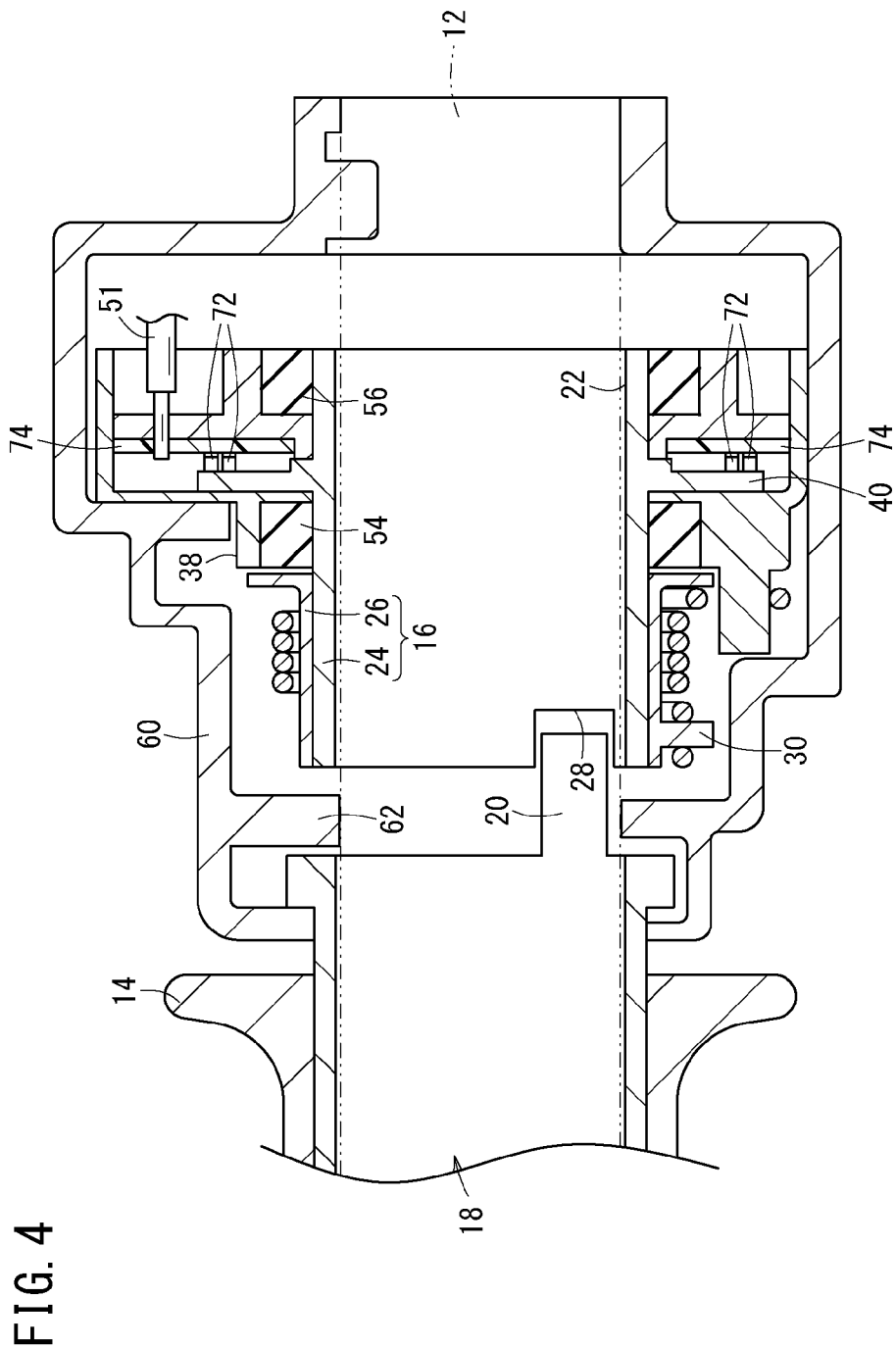
FIG. 4 is a cross-sectional view of a core portion of a throttle control apparatus according to a second illustrative embodiment of the present invention.

For example, in this embodiment, although the magnetic sensor (Hall element 50) is adopted as the position senor for detecting a rotational angle of the rotor 16, the position senor is not particularly limited to the magnetic sensor. That is, as shown in FIG. 4, a brush 72 (contact element) may be mounted on the rotor 16, and a resistor 74 to which the brush 72 is brought into slide contact may be adopted as a position senor. In FIG. 4, constitutional elements identical with the constitutional elements shown in FIG. 1 and FIG. 2 are given the same reference symbols.

In this case, when the position of the brush 72 on the resistor 74 is changed corresponding to a rotational angle of the rotor 16, along with the displacement of the brush 72, a resistance value between terminals to which the resistor 74 is electrically connected respectively is changed. A rotational angle of the rotor 16 can be obtained by converting such a change in resistance value to a rotational angle.

Further, the rotor 16 may be constituted of a single member. In addition, while the specification primarily describes the throttle control apparatus hereof as configured to be used on a motorcycle, it may alternately be used on any saddle-type vehicle, such as an all-terrain vehicle (ATV), a scooter, a personal watercraft, or any other saddle-type vehicle having a handlebar and using a throttle grip of the general type described herein.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

We claim:

1. A throttle control apparatus which is configured to be mounted on a handlebar of a vehicle, the throttle control apparatus comprising:
   a rotor which is pivotally movable by a user via rotation of a throttle grip, said rotor including an engaging member, and said rotor and said throttle grip each having an engaging portion formed thereon;
   an intermediate case which surrounds a portion of the rotor, wherein the intermediate case is adapted to be non-rotatably affixed to the handlebar in an installed position of the apparatus;
   an outer housing which houses the rotor and the intermediate case therein, and is adapted to be mounted on the handlebar;
   a position sensor disposed in the intermediate case for detecting a rotational angle of the rotor; and
   a return spring for returning the rotor to an original position after rotation thereof;
   wherein the return spring has a first end operatively connected to the rotor and engaged with the engaging member of the rotor, and a second end operatively connected to the intermediate case; and the engaging portions on the throttle grip and rotor are engaged with each other in a manner such that a gap is formed there between.

2. The throttle control apparatus according to claim 1, wherein the outer housing comprises at least one rib for limiting pivotal movement of the throttle grip.

3. The throttle control apparatus according to claim 1, wherein the position sensor comprises a magnetic sensor.

4. The throttle control apparatus according to claim 1, wherein the throttle control apparatus includes a contact element mounted on the rotor, and the position sensor comprises a variable resistor with which the contact element is brought into slide contact.

5. The throttle control apparatus according to claim 1, wherein the rotor comprises a substantially cylindrical rotor body, and a sleeve member which is concentrically fitted outside of the rotor body.

6. The throttle control apparatus according to claim 5, wherein the return spring is a coil spring disposed surrounding a portion of the rotor body outside of the intermediate case.

7. The throttle control apparatus according to claim 1, wherein the outer housing comprises a stop member for limiting pivotal movement of the rotor, such that a range of motion of the spring is also limited.

8. The throttle control apparatus according to claim 1, wherein the position senor is a magnetic Hall effect sensor, and further comprising an inner support member disposed between the rotor and the intermediate case, where the inner support member protectively covers a magnetic element of the Hall effect sensor.

9. A vehicle comprising a handlebar and the throttle control apparatus of claim 1 installed on the handlebar.

10. A throttle control apparatus which is configured to be mounted on a handlebar of a vehicle, the throttle control apparatus comprising:
a rotor which is pivotally movable by a user via rotation of a throttle grip, the rotor comprising a substantially cylindrical rotor body and a sleeve member which is concentrically fitted outside of the rotor body, said rotor including an engaging member, and said rotor and said throttle grip each having an engaging portion formed thereon;
an intermediate case which surrounds a portion of the rotor, wherein the intermediate case is adapted to be non-rotatably affixed to the handlebar in an installed position of the apparatus;
an outer housing which houses the rotor and the intermediate case therein, and is adapted to be mounted on the handlebar, the outer housing comprising a stop member for limiting pivotal movement of the throttle grip;
a position sensor disposed in the intermediate case for detecting a rotational angle of the rotor; and
a return spring for returning the rotor to an original position after rotation thereof;
wherein the return spring has a first end operatively connected to the rotor and engaged with the engaging member of the rotor, and a second end operatively connected to the intermediate case, and the engaging portions on the throttle grip and rotor are engaged with each other in a manner such that a gap is formed there between.

11. The throttle control apparatus according to claim 10, wherein the stop member of the outer housing comprises at least one inwardly-extending rib configured and arranged to limit pivotal movement of the throttle grip.

12. The throttle control apparatus according to claim 10, wherein the position sensor comprises a magnetic Hall effect sensor.

13. The throttle control apparatus according to claim 10, wherein the throttle control apparatus includes a contact element mounted on the rotor, and the position sensor comprises a variable resistor with which the contact element is brought into slide contact.

14. A vehicle comprising a handlebar and the throttle control apparatus of claim 10 installed on the handlebar.

15. A throttle control apparatus which is configured to be mounted on a handlebar of a vehicle, the throttle control apparatus comprising:
a rotor which is pivotally movable by a user via rotation of a throttle grip, said rotor comprising a substantially cylindrical rotor body and a sleeve member which is concentrically fitted outside of the rotor body;
an intermediate case which surrounds a portion of the rotor, wherein the intermediate case is adapted to be non-rotatably affixed to the handlebar in an installed position of the apparatus;
an outer housing which houses the rotor and the intermediate case therein, and is adapted to be mounted on the handlebar;
a position sensor disposed in the intermediate case for detecting a rotational angle of the rotor; and
a return spring for returning the rotor to an original position after rotation thereof;
wherein the return spring is a coil spring disposed surrounding a portion of the rotor body outside of the intermediate case, and has a first end operatively connected to the rotor, and a second end operatively connected to the intermediate case.

16. A throttle control apparatus which is configured to be mounted on a handlebar of a vehicle, the throttle control apparatus comprising:
a rotor which is pivotally movable by a user via rotation of a throttle grip, the rotor comprising a substantially cylindrical rotor body and a sleeve member which is concentrically fitted outside the rotor body;
an intermediate case which surrounds a portion of the rotor, wherein the intermediate case is adapted to be non-rotatably affixed to the handlebar in an installed position of the apparatus;
an outer housing which houses the rotor and the intermediate case therein, and is adapted to be mounted on the handlebar, the outer housing comprising a stop member for limiting pivotal movement of the throttle grip;
a position sensor disposed in the intermediate case for detecting a rotational angle of the rotor; and
a return spring for returning the rotor to an original position after rotation thereof;
wherein the return spring is a coil spring disposed surrounding a portion of the rotor body outside of the intermediate case, having a first end operatively connected to the rotor, and a second end operatively connected to the intermediate case.

* * * * *